US006242698B1

(12) United States Patent
Baker, III et al.

(10) Patent No.: US 6,242,698 B1
(45) Date of Patent: Jun. 5, 2001

(54) INTERCHANGEABLE ADAPTER FACE PLATES

(75) Inventors: Frank Phillips Baker, III, Chatham; Golam Mabud Choudhury, Warren; Theodore Alan Conorich, Lake Hiawatha, all of NJ (US); Lyndon Dee Ensz, Omaha, NE (US); Wayne Scott Filus, Lebanon, NJ (US); William John Ivan, Woodbridge, NJ (US); John Anthony Rutkowski, Jackson, NJ (US)

(73) Assignee: Avaya Technology Corporation, Holmdel, NJ (US)

( * ) Notice: Subject to any disclaimer, the term of this patent is extended or adjusted under 35 U.S.C. 154(b) by 0 days.

(21) Appl. No.: 09/207,594

(22) Filed: Dec. 8, 1998

(51) Int. Cl.[7] .............................. H01B 3/00; H02G 3/00
(52) U.S. Cl. ................... 174/72 A; 174/59; 174/65 R; 361/644; 361/669; 439/949; 52/220.7; 220/3.2; 220/3.3
(58) Field of Search ................... 174/72 A, 65 R, 174/59; 361/644, 669, 645; 220/3.2, 3.3; 439/949; 52/220.7, 220.1

(56) References Cited

U.S. PATENT DOCUMENTS

| D. 387,652 | 12/1997 | Carlson, Jr. ........................ D8/356 |
| D. 388,400 | 12/1997 | Rogers ............................... D13/199 |
| 3,829,818 | * 8/1974 | Iosue et al. ............................ 339/19 |
| 4,288,838 | * 9/1981 | Van Der Vegte et al. ............. 361/383 |
| 4,320,261 | 3/1982 | Scerbo et al. ............................ 179/98 |
| 4,563,050 | 1/1986 | Greenwood et al. ................. 339/99 R |
| 4,866,215 | 9/1989 | Muller et al. ............................ 174/50 |
| 5,067,678 | 11/1991 | Henneberger et al. ............. 248/68.1 |
| 5,277,006 | 1/1994 | Ruster ................................. 52/220.7 |
| 5,336,097 | 8/1994 | Williamson, Jr. et al. ............. 439/94 |
| 5,546,495 | 8/1996 | Bruckner et al. ..................... 385/135 |
| 5,615,682 | 4/1997 | Stratz, Jr. ......................... 128/662.03 |
| 5,639,261 | 6/1997 | Rutkowski et al. .................. 439/534 |
| 5,655,738 | 8/1997 | Ragsdale et al. .................... 248/68.1 |
| 5,700,167 | 12/1997 | Pharney et al. ...................... 439/676 |
| 5,718,604 | 2/1998 | Conorich et al. .................... 439/501 |
| 5,721,396 | * 2/1998 | Daoud ................................... 174/59 |
| 5,730,400 | 3/1998 | Rinderer et al. .................... 248/68.1 |
| 5,731,546 | 3/1998 | Miles et al. .......................... 174/135 |
| 5,740,300 | 4/1998 | Hodge ................................. 385/135 |
| 5,804,765 | 9/1998 | Siemon et al. ..................... 174/65 R |

* cited by examiner

Primary Examiner—Dean A. Reichard
Assistant Examiner—W. David Walkenhorst
(74) Attorney, Agent, or Firm—Dickstein Shapiro Morin & Oshinsky LLP

(57) ABSTRACT

A cable management system includes an adapter plate disposed between a panel and a cabling component, such as a wiring block or wiring trough. The adapter plate includes a first plurality of fasteners and a first plurality of alignment pins extending orthogonally from a first surface, and second plurality of fasteners and a second plurality of alignment pins extending orthogonally from a second surface. The first plurality of fasteners engage tabs formed on the panel and the second plurality of fasteners engage features formed on the cabling component. The first plurality of alignment pins are disposed to engage alignment apertures formed in the panel. The second plurality of alignment pins are disposed to engage alignment apertures formed in the cabling component. The adapter plate can include an abutment portion disposed to abut the panel and cooperate with the first plurality of fasteners to position the adapter plate relative to the panel. The adapter plate can also include integrally molded cabling components to reduce the number of piece parts required for installation of a cabling system.

20 Claims, 11 Drawing Sheets

INTERCHANGEABLE ADAPTER FACE PLATES

TECHNICAL FIELD OF THE INVENTION

The present invention relates to cable management systems and particularly to telephone cable management systems using a wall or frame-mounted panel, and wiring blocks and troughs coupled to the panel, and more particularly to an adapter plate retained on the panel between the panel and the wiring blocks and troughs for facilitating installation of communication equipment.

BACKGROUND ART

As illustrated in FIGS. 1 and 2, conventional telephone cable management systems include a metal panel 10 defining a channel 11 attached to a wall. The panel 10 includes a base wall 12, a pair of side walls 14 extending from the base wall 12, and a plurality of tabs 16 extending inwardly from the side walls 14. The tabs 16 include trough tabs 16a and wiring block tabs 16b alternating along the length of the panel 10. A plurality of wiring blocks 20 and troughs 22 are alternately attached to the tabs 16a and 16b, respectively, and a duct assembly 24 is attached to the bottom of the panel 10.

As illustrated in FIG. 2, a wiring bundle 30 is routed in the channel 11 behind the wiring blocks 20 and troughs 22. Patch cords 26 are coupled to the wiring blocks 20 and run through the troughs 22 to wire rings 32, and then routed down to the duct assembly 24 for further routing as necessary.

The conventional cable management system has worked well in the past, but it has several disadvantages. First, the alternating trough tabs 16a and wiring block tabs 16b limit the utility of the panel to a single configuration of alternating troughs and wiring blocks. Second, the panel is only available in two sizes, i.e., a 300 pair size and a 900 pair size. A third disadvantage arises with the advent of new high bit rate data type cables that have been increasing in diameter. The increased diameter has decreased the available free space in the channel 11 behind the wiring blocks 20 and troughs 22. A fourth disadvantage becomes apparent during cable installation. When the cables are organized into their respective slots, and before the wiring blocks 20 are installed, the lack of any significant retention mechanism allows the sorted cables to fall out of their assigned positions. As a result, experienced craftspersons use wire ties or scrap wire to tie the cables into the panel. This procedure of tying the cables adds to the time required for installation and forces the craftsperson to carry wire ties or scrap wire, which is inconvenient. A related disadvantage is that the craftspersons must carry fasteners for attaching the wiring blocks and troughs to the panel, adding to the inconvenience and requiring additional parts inventory.

SUMMARY OF THE INVENTION

The present invention overcomes the above cited disadvantages of conventional cable management systems and provides additional advantages by providing an adapter plate that easily and conveniently attaches to the wall panel and facilitates the attachment of varying configurations of cabling components, such as troughs and wiring blocks for retaining 110-type connector blocks, to the wall panel.

According to the present invention, a cable management system comprises an adapter plate disposed between a panel and a cabling component. The adapter plate includes a plurality of fasteners for retaining the cabling component on the panel.

According to one aspect of the invention, the adapter plate includes a first surface and a second surface, and the plurality of fasteners includes a first plurality of fasteners extending orthogonally from the first surface. Each of the first plurality of fasteners includes a proximal end attached to the first surface, a distal end, and an engagement portion attached to the distal end. The adapter plate further includes a first plurality of alignment pins and a second plurality of alignment pins. The first plurality of alignment pins extends orthogonally from the first surface, the alignment pins being disposed so as to engage alignment apertures formed in the panel. The second plurality of alignment pins extend orthogonally from the second surface, the second plurality of alignment pins being disposed to engage alignment apertures formed in the wiring block. According to another aspect of the invention, the adapter plate includes an abutment portion disposed to abut the panel and cooperate with the first plurality of fasteners to position the adapter plate relative to the panel.

In one embodiment of the invention, the abutment portion includes a flange depending from an edge of the adapter plate to orient the adapter plate at an angle relative to the panel, thereby providing an angled adapter plate to facilitate craftsperson access when the adapter plate is located at the top or bottom of the wall panel.

In another embodiment of the invention, the abutment portion includes a pair of flanges depending from opposite edges of the adapter plate, the flanges being sized to provide additional depth to the panel, thereby increasing the size of the channel behind the connector hardware.

The present invention includes integrally molded fasteners that engage the wall panel, wiring blocks, and troughs, thereby eliminating the need for fasteners to be carried by the craftsperson or maintained in inventory. In addition, the present invention positions the plurality of alignment pins and the plurality of fasteners to make use of existing features on the wiring blocks and troughs, thereby permitting the use of conventional wiring blocks and troughs with the invention.

These and other features and advantages of the invention will become more readily apparent from the following detailed description of a preferred embodiment of the present invention which is provided in connection with the accompanying drawings.

BEST MODE FOR CARRYING OUT THE INVENTION

Adapter plates according to the present invention are illustrated in FIGS. 3–14. The adapter plates are configured to attach to a stackable, modular wall panel 50 and to cabling components, such as wiring blocks and/or troughs. Advantageously, the present adapter plate allows for multiple cable management system configurations using the same panel 50.

Figure 1:
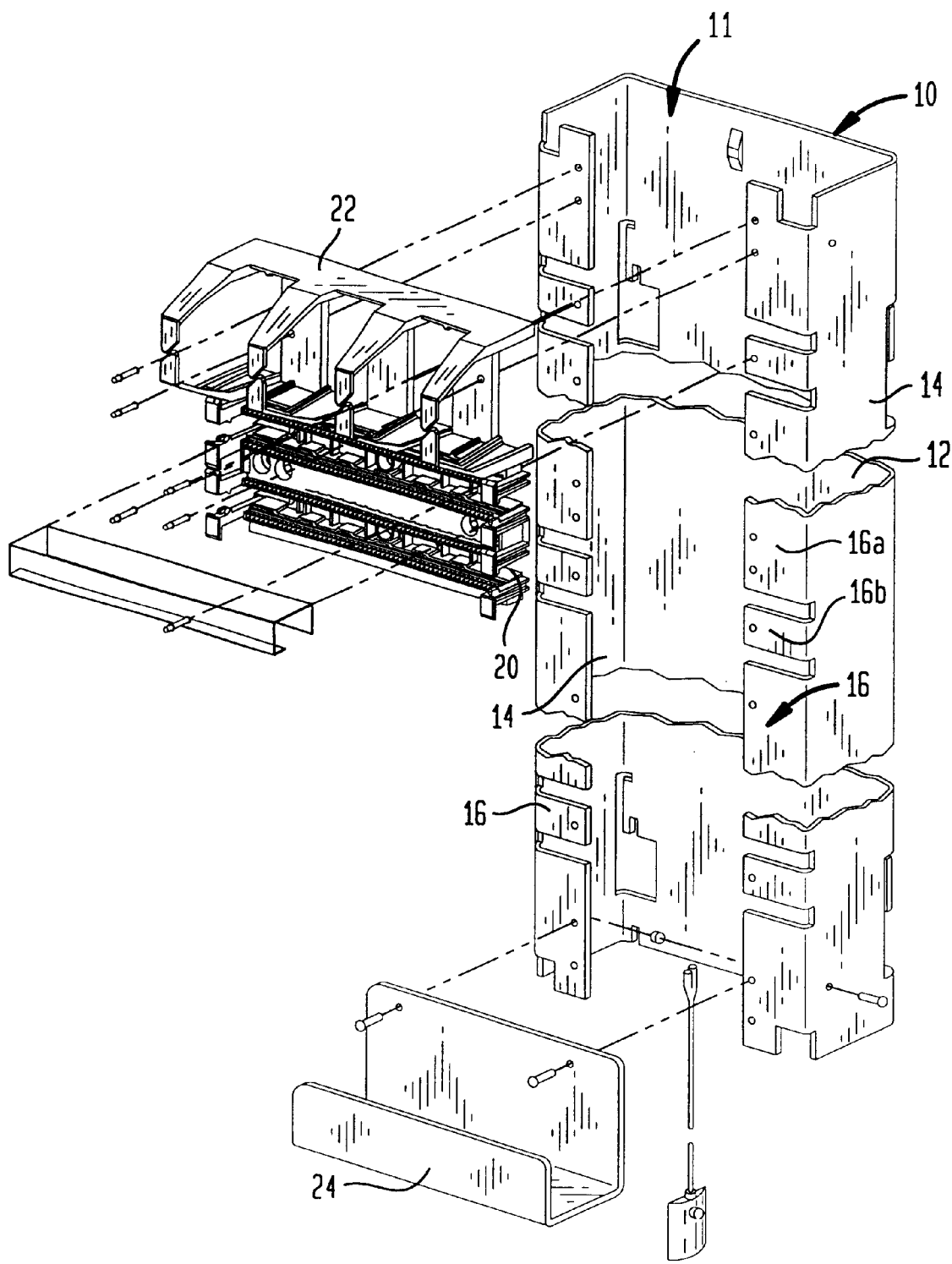
FIG. 1 is an exploded perspective view of a portion of a conventional cable management system.
Figure 2:
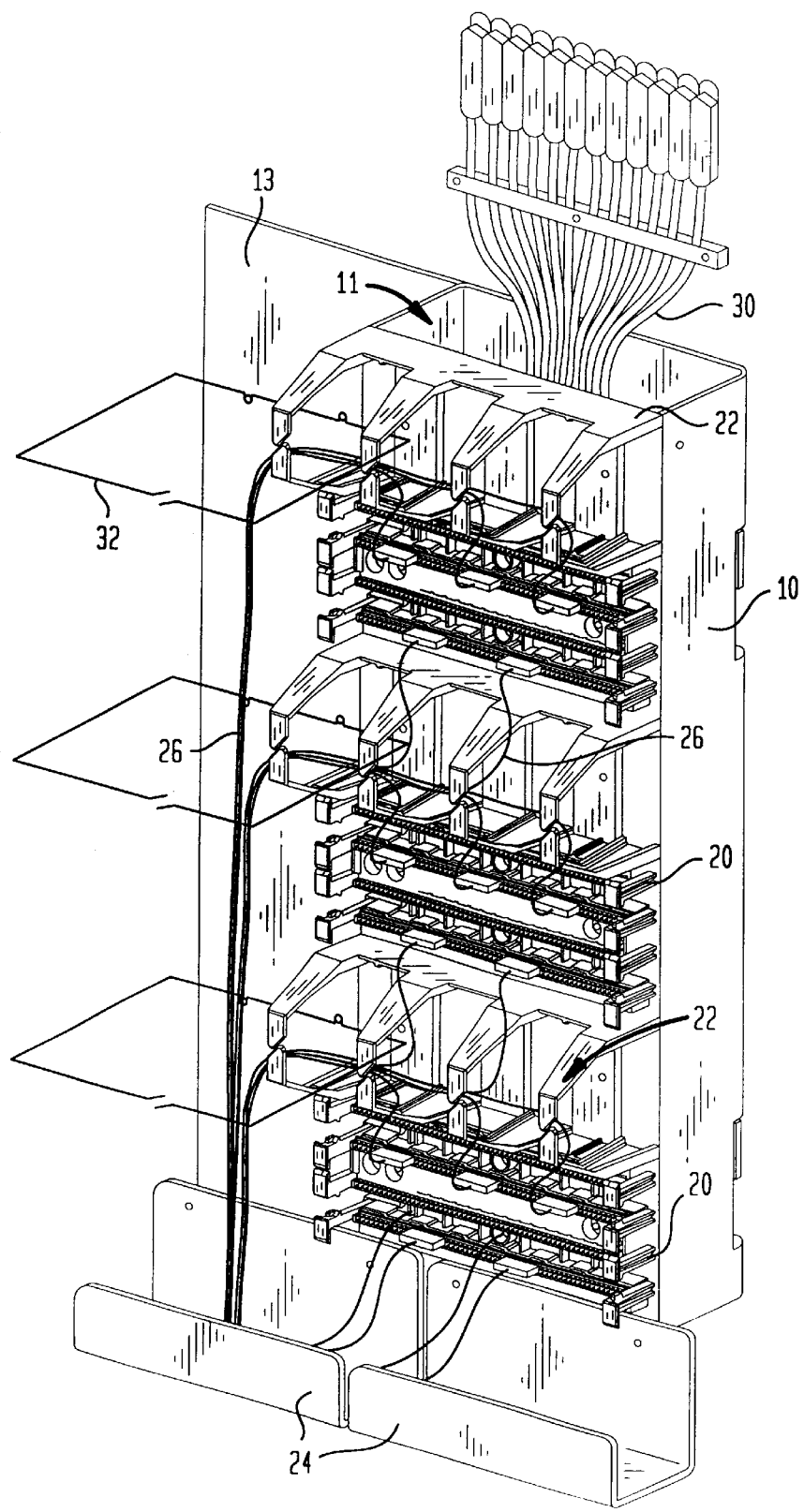
FIG. 2 is a perspective view of an assembled conventional cable management system.
Figure 3:
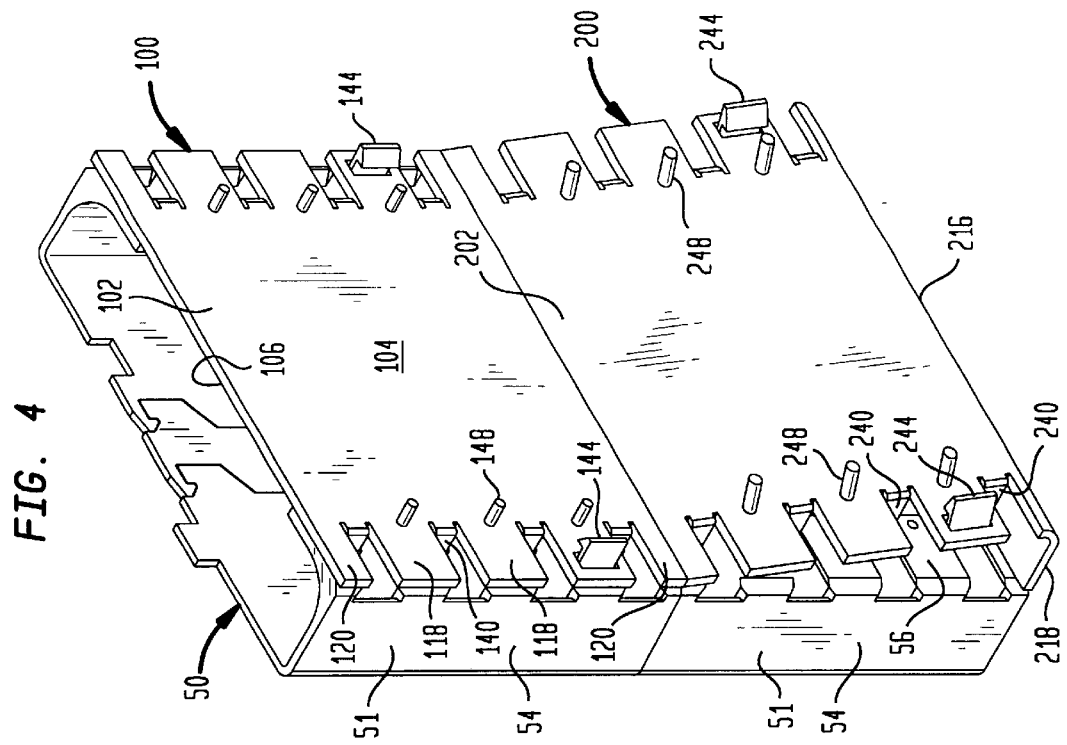
FIG. 3 is a perspective view illustrating a first embodiment of the flat adapter plate coupled to a panel and a second embodiment in position to be coupled to the panel.
Figure 7:
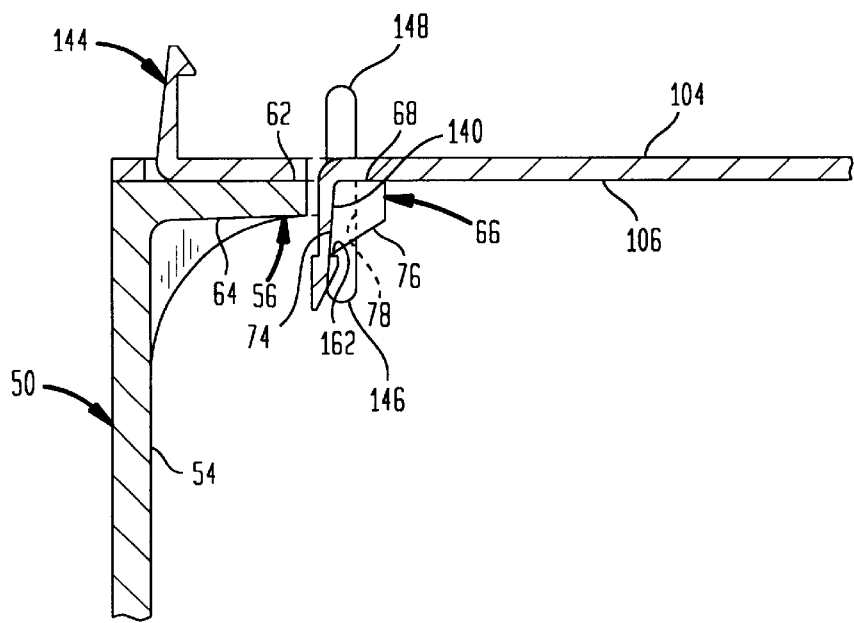
FIG. 7 is a partial section view taken along lines 7—7 in FIG. 3 illustrating an adapter plate coupled to tabs formed on the panel.
Figure 13:
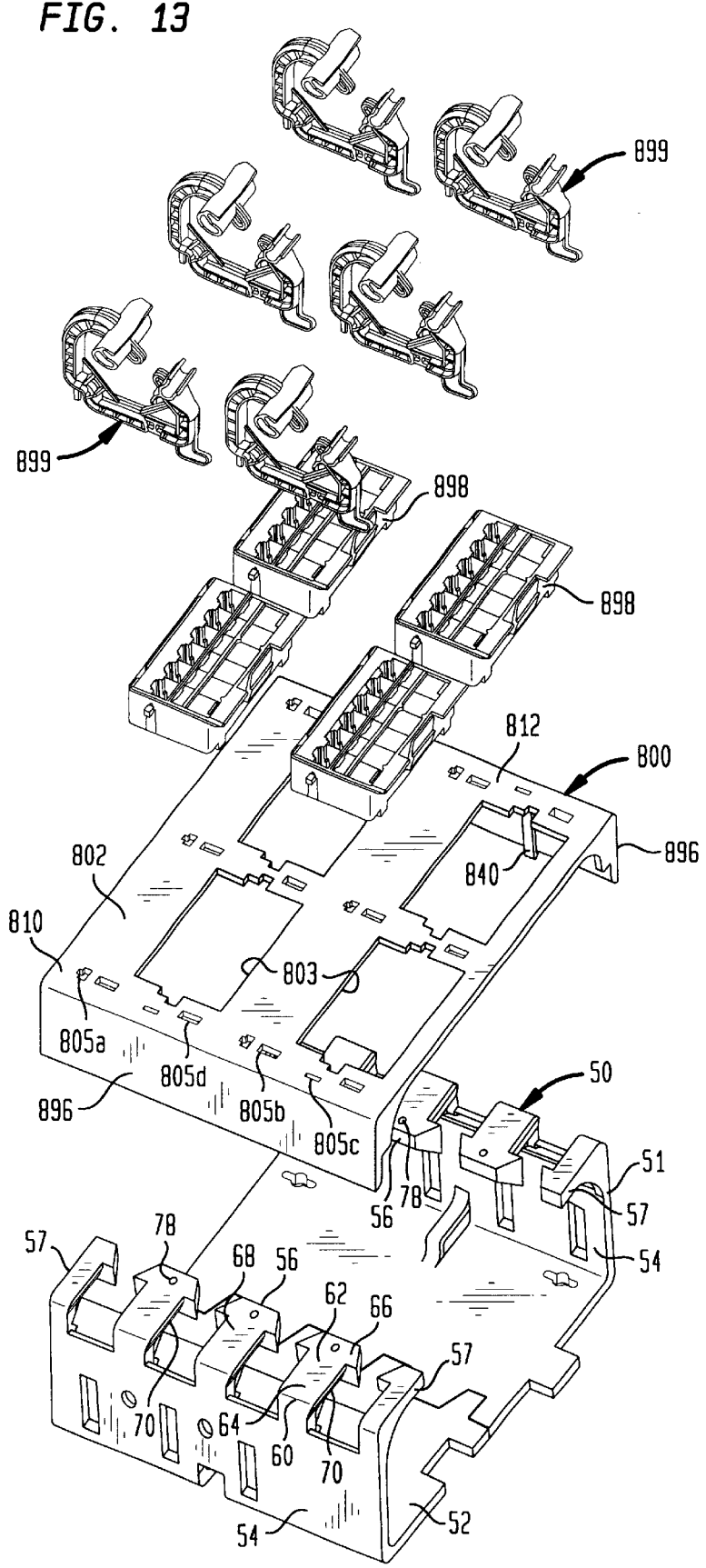
FIG. 13 is an exploded perspective view illustrating the relative positioning of a panel, an eighth embodiment of the adapter plate, and components of a cable patching system.
Figure 14:
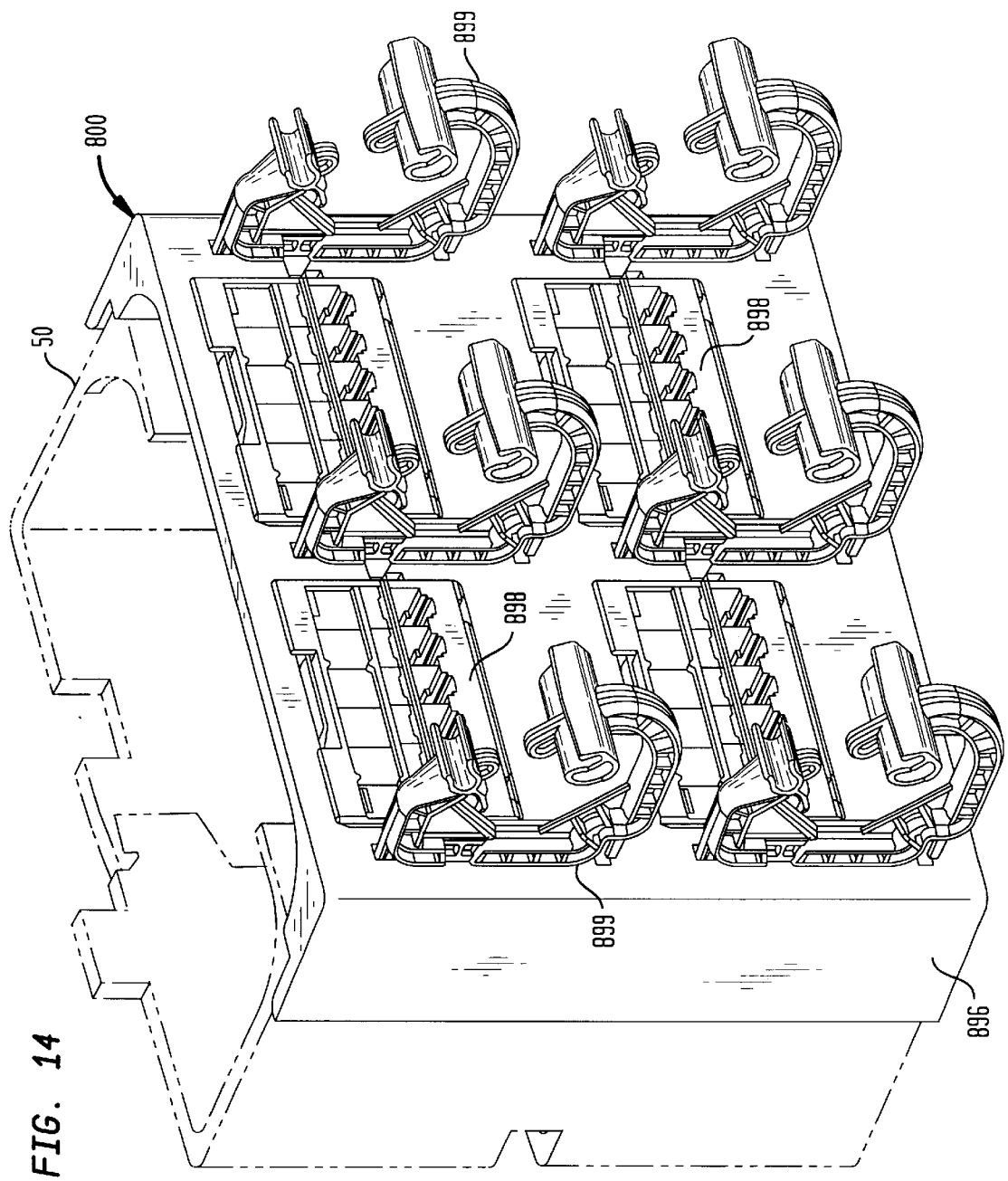
FIG. 14 is a perspective view illustrating the components of FIG. 13 as assembled.

The panel 50, which is best seen with reference to FIGS. 3, 7 and 13, includes a plurality of modules 51 that are interconnected to provide a panel 50 of any desired length, it can extend from the floor to the ceiling if desired. Each module includes a base wall 52 and a pair of side walls 54 extending orthogonally from the base wall 52. A plurality of generally arrow-shaped tabs 56 extend inwardly from the side walls 54 and cooperate with the base wall 52 and side walls 54 to give the module 51 a C-shaped cross section. Each module 51 further includes half tabs 57 (FIG. 13) formed at the upper and lower ends of the module 51. When two or more modules 51 are assembled to form a panel 50, the half tabs 57 on one module 51 cooperate with the half tabs 57 on the adjacent module 51 to define full width tabs. Thus, a panel 50 includes multiple modules 51 but presents a continuous series of evenly spaced, equally sized tabs.

The arrow-shaped tabs 56 include a proximal end 60 attached to the side walls 54, a distal end 62, an arm 64 extending between the proximal and distal ends 60, 62, respectively, and a trapezoidal engagement portion 66 attached to the distal end 62. The arrow-shaped tabs 56 further include a top surface 68 and a pair of beveled side surfaces 70 that extend downwardly and inwardly from the top surface 68.

The trapezoidal engagement portion 66 includes a first engagement surface 74 and a second engagement surface 76 (FIG. 7). The first engagement surface 74 depends downwardly from the top surface 68 and is disposed in a facing relationship with the side walls 54. The second engagement surface 76 extends upwardly from the bottom of the first engagement surface 74 at an acute angle, as best seen in FIG. 7. An alignment aperture 78 is centrally disposed in the trapezoidal engagement portion 66.

Figure 4:
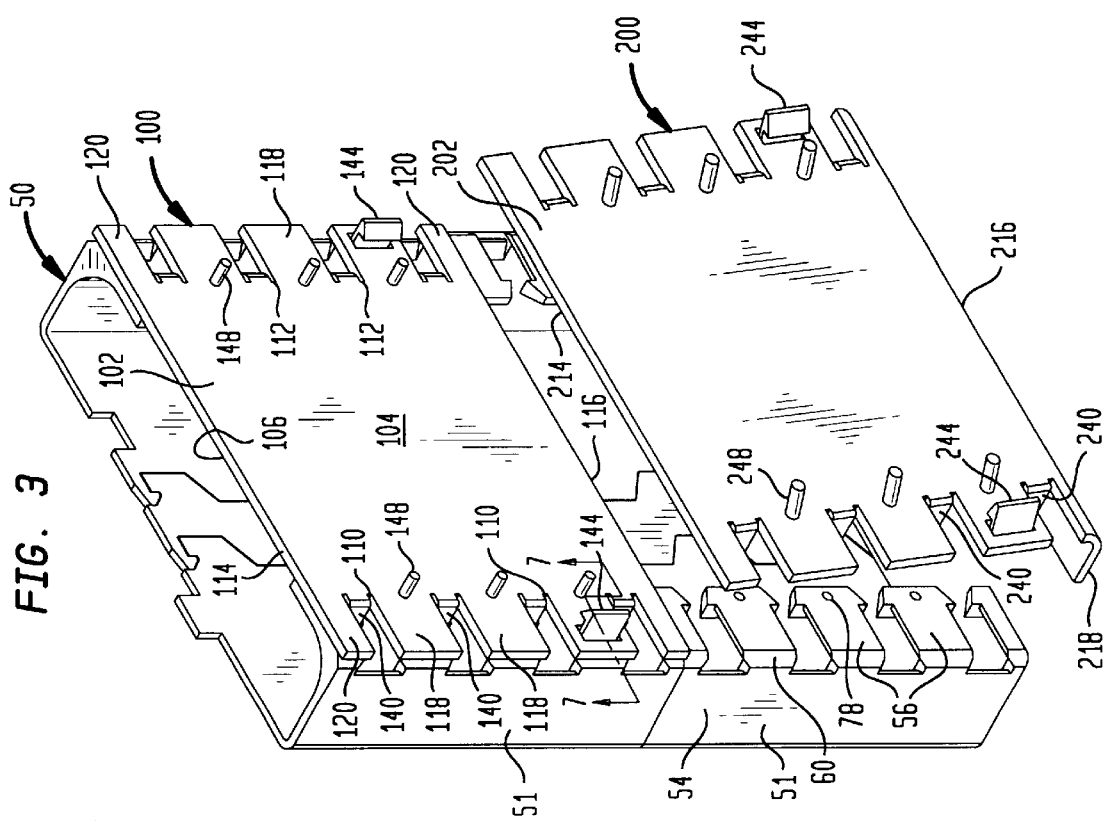
FIG. 4 is a perspective similar to FIG. 3 illustrating the angled adapter plate coupled to the panel.

FIGS. 3 and 4 illustrate first and second embodiments of the adapter plate 100, 200, respectively. The adapter plate 100 includes a generally rectangular base member 102 having an upper surface 104, a lower surface 106, side edges 110, 112, and top and bottom edges 114, 116, respectively. A plurality of abutment portions 118, 120 extend from the side edges 110, 112. Abutment portions 120 are formed at each of the top and bottom edges 114, 116 and are substantially half as wide as the abutment portions 118. Thus, when two adapter plates 100 are disposed adjacent each other on the panel 50, or when one adapter plate 100 and one adapter plate 200 are disposed adjacent to each other as illustrated in FIG. 4, the abutment portions 120 of one of the adapter plates 100 cooperate with tie abutment portions 120 of the other adapter plate 100, 200 to effectively provide a single abutment portion having a width equal to abutment portions 118. The abutment portions 118, 120 are spaced-apart and disposed to align with, and abut, the arrow-shaped tabs 56 on the panel 50.

Figure 5:
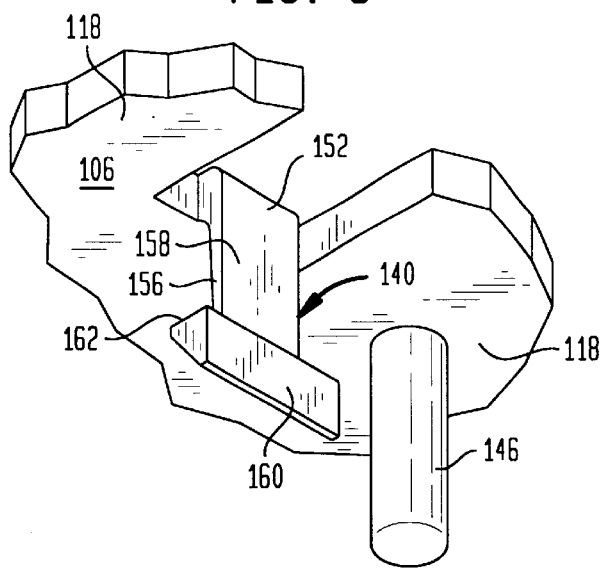
FIG. 5 is a perspective view illustrating a lower alignment pin and a lower fastener for aligning and retaining an adapter plate on a panel.

The adapter plate 100 further includes a plurality of lower fasteners 140, a plurality of upper fasteners 144, a plurality of lower alignment pins 146 (FIG. 5) and a plurality of upper alignment pins 148. The lower fasteners 140, illustrated in FIG. 5, are disposed between the abutment portions 118 and extend orthogonally from the lower surface 106. Each lower fastener 140 includes a proximal end 152 attached to the base member 102, a distal end 156, an arm 158 extending between the proximal end 152 and the distal end 156, and an engagement portion 160 attached to the distal end 156. The engagement portion 160 has a triangular cross section and extends beyond the lateral edges of the arm 158. The engagement portion 160 further includes an engagement surface 162 configured to abut engagement surface 76 of the arrow-shaped tabs 56, as illustrated in FIG. 7. The plurality of lower alignment pins 146 extend downwardly from the lower surface 106 and generally parallel to and spaced-apart from the lower fasteners 140. The lower alignment pins 146 are positioned to engage alignment apertures 78 formed in the arrow-shaped tabs 56 when the adapter plate 100 is attached to the panel 50.

Figure 6:
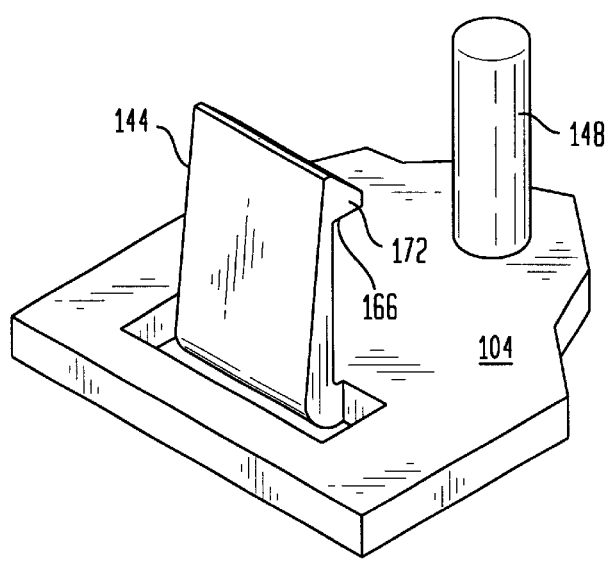
FIG. 6 is a perspective view of an upper alignment pin and an upper fastener for aligning and retaining a wiring block or trough on the adapter plate.

The upper fasteners 144, illustrated in FIG. 6, extend upwardly from the upper surface 104 to a triangular engaging portion 172. The triangular engaging portion 172 includes an engagement surface 166 configured to engage a conventional wiring block. The upper fasteners 144 are spaced apart in a predetermined position relative to the upper alignment pins 148. The plurality of upper alignment pins 148 extend upwardly from the upper surface 106 and are disposed in a predetermined relation to the upper fasteners 144, as illustrated in FIG. 6, to engage complementary alignment apertures formed in conventional wiring blocks or troughs for alignment and retention of the wiring blocks or troughs on the adapter plate 100.

The second embodiment of the adapter plate 200 (FIG. 4) includes a base member 202 and an abutment flange 218 that extends downwardly from the base member 202 to abut the panel 50. The abutment flange 218 positions the bottom edge 216 of the adapter plate 200 away from the panel 50 to align the adapter plate 200 at an angle relative to the panel 50. In order to retain the adapter plate 200 on the panel 50, lower fasteners 240 get progressively longer from the top edge 214 to the bottom edge 216 in order to accommodate the increasing distance between the adapter plate 200 and the panel 50. In addition, the lower fasteners 240 extend from the base member 202 at an angle equal to the angle between the adapter plate 200 and the panel 50. Preferably, the adapter plate 200 further includes at least one pair of lower alignment pins (not shown) to engage the apertures 78. In all other respects, such as lower and upper fasteners 240, 244, respectively, and upper alignment pins 248, the adapter plate 200 is the same as adapter plate 100. Advantageously, the adapter plate 200 is oriented at a more convenient angle for a craftsperson, facilitating access to wiring blocks and troughs coupled to the adapter plate 200 when the adapter plate 200 is at the top or bottom of the panel 50.

Figure 8:
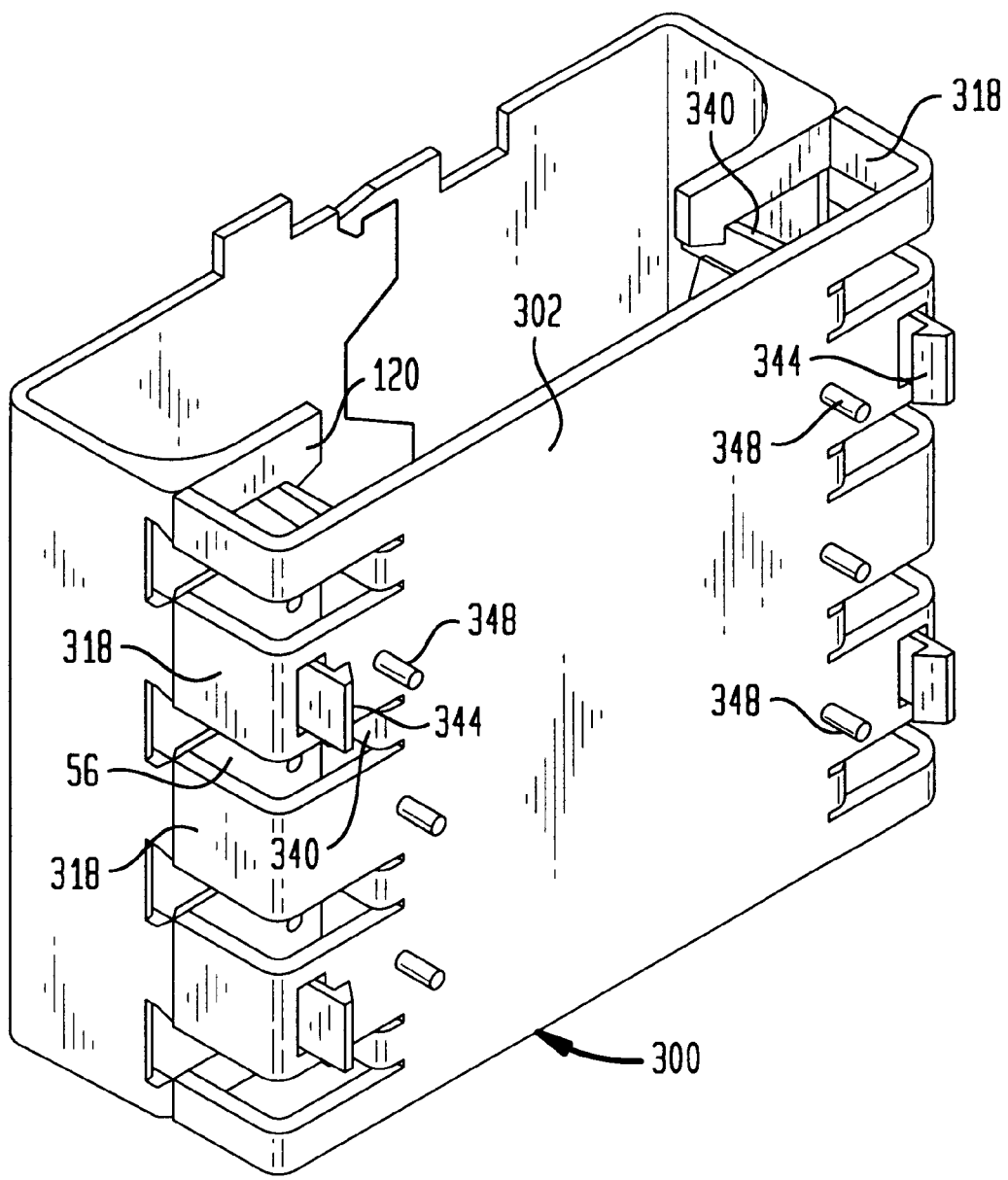
FIG. 8 is a perspective view illustrating a third embodiment of the adapter plate.

FIG. 8 illustrates a third embodiment of the adapter plate 300. The adapter plate 300 includes upper fasteners 344 and upper alignment pins 348, that are the same as upper fasteners 144 and upper alignment pins 148, extending from the base member 302. In addition, the adapter plate 300 includes abutment fingers 318 extending downwardly from the ends of the base member 302 to raise the adapter plate 300 away from the panel 50. Of course, lower fasteners 340 are necessarily longer than lower fasteners 140 to accommodate the increased distance between the base member 302 and the panel 50. Advantageously, the adapter plate 300 provides additional depth to the panel 50 to accommodate the larger high bit rate data type cables.

Figure 9:
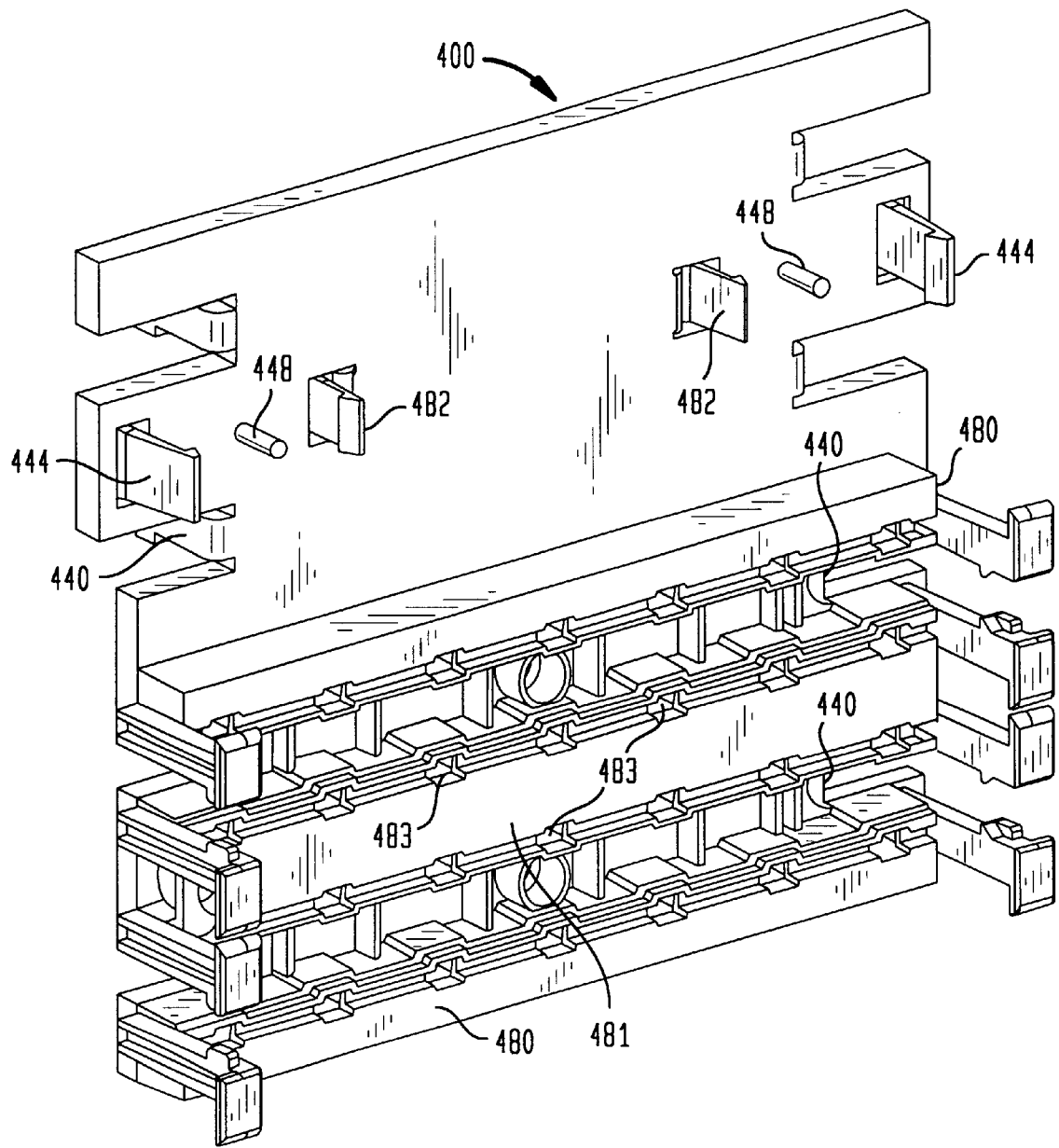
FIG. 9 is a perspective view illustrating a fourth embodiment of the adapter plate having an integrally molded wiring block.
Figure 10:
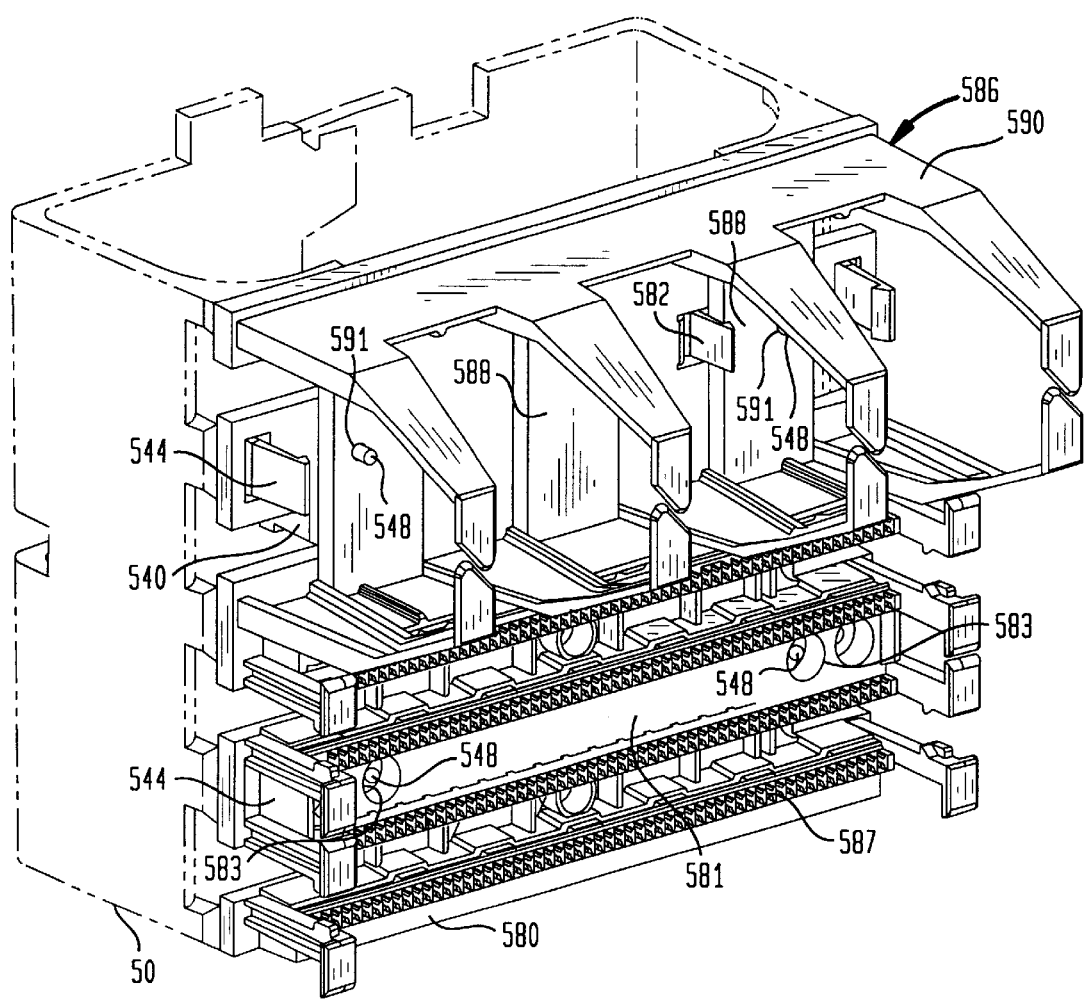
FIG. 10 is a perspective view of a fifth embodiment of the adapter plate coupled to a panel with a trough and one 100 pair wiring block coupled to the adapter plate.

FIG. 9 illustrates a fourth embodiment 400 of the adapter plate that includes a plurality of lower fasteners 440, a pair of upper fasteners 444, a plurality of upper alignment pins 448, and a plurality of integrally molded wiring blocks 480. In addition, adapter plate 400 includes a pair of inner upper fasteners 482 that are smaller versions of upper fasteners 444, with the inner upper fasteners 482 and upper fasteners 444 being disposed in a facing relationship. The upper alignment pins 448 and the inner upper fasteners 482 cooperate to align and retain a cabling component. FIG. 10, discussed below with respect to a different embodiment of the adapter plate, illustrates such a component, trough 586, aligned and retained on an adapter plate.

The integrally molded wiring blocks 480 have a conventional configuration, including a ledge 481 and alignment apertures 483 and are configured to receive conventional 110-type index strips (FIG. 10). In a non-integrally molded wiring block 580, as illustrated in FIG. 10, a ledge 581 engages upper fasteners, such as upper fasteners 144, 244, 344 to retain the wiring block 580 on the adapter plate, and the alignment apertures 583 receive upper alignment pins, such as upper alignment pins 148, 248, 348, 448 to align the wiring block with the adapter plate.

Still referring to FIG. 10, a fifth embodiment adapter plate 500 is attached to a panel 50, and includes lower fasteners 540, upper fasteners 544, upper alignment pins 548 and upper inner fasteners 582. Conventional wiring blocks 580 and a conventional wiring trough 586 are attached to the adapter plate 500. The trough 586 includes a plurality of vertical support members 588 attached to, and separating, a pair of finger plates 590. As illustrated, upper alignment pins 548 extend through apertures 591 formed in the vertical support members 588 and inner upper fasteners 582 engage vertical support members 588 to align and retain the trough 586 on the adapter plate 500. Upper alignment pins 548 engage alignment apertures 583 formed in the wiring block 580, and upper fasteners 544 engage ledge 581 to align and retain the wiring block 580 on the adapter plate 500. A plurality of conventional 110-type index strips 587 are installed in the wiring blocks 580.

Advantageously, the present invention makes use of existing apertures 583 formed in conventional wiring blocks to align the wiring block with the adapter plate and uses the existing ledge 581 to engage the upper fasteners to retain the wiring block on the adapter plate. Likewise, the inner upper fasteners cooperate to engage existing vertical support members of conventional troughs to retain the troughs on the adapter plate and the upper alignment pins engage existing apertures formed in the vertical support members to align the trough with the adapter plate. Accordingly, the present invention can use existing conventional troughs and wiring blocks without making any modifications to the wiring blocks or troughs.

Figure 11:
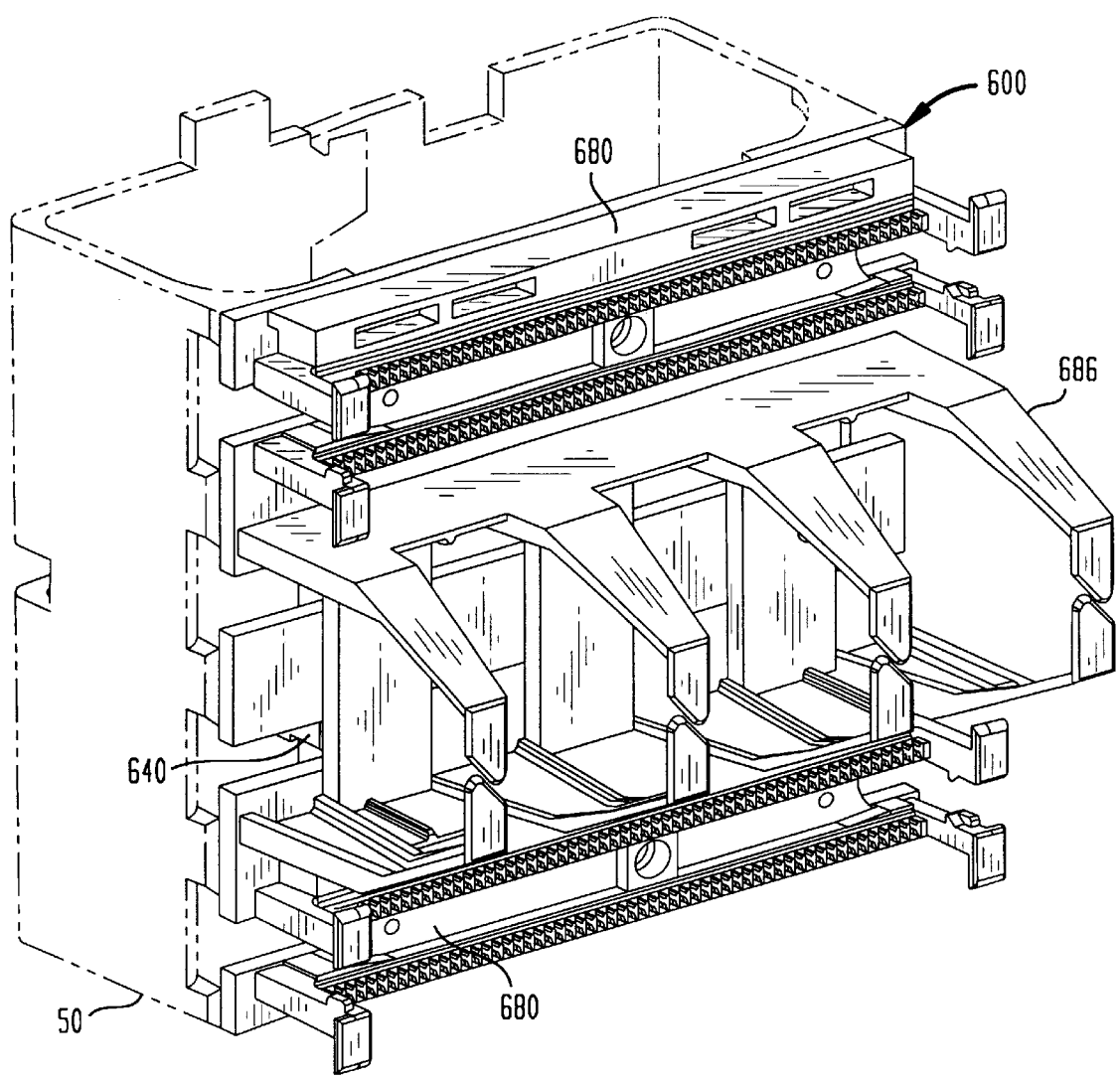
FIG. 11 is a perspective view of a sixth embodiment of the adapter plate having an integrally molded trough and integrally molded wiring blocks coupled to the adapter plate.

FIG. 11 illustrates a sixth embodiment of an adapter plate 600 of the invention. The adapter plate 600 includes a pair of integrally molded wiring blocks 680 and an integrally molded trough 686. The wiring blocks 680 are disposed on opposite sides of trough 686. Lower fasteners 640 attach the adapter plate 600 to the panel 50, and at least one pair of lower alignment pins (not shown) engage alignment holes in the arrow-shaped tabs 56.

Figure 12:
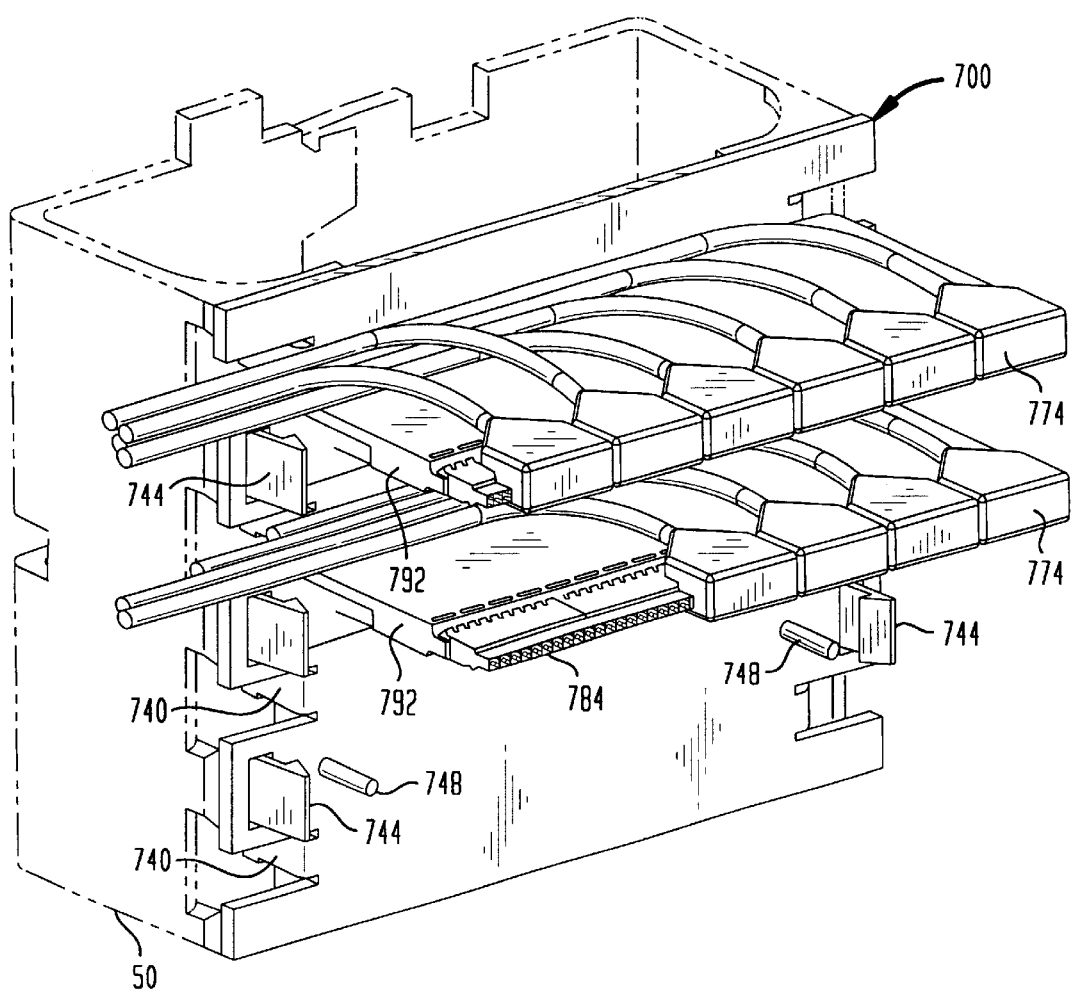
FIG. 12 is a perspective view of a configuration of a panel, a seventh embodiment of the adapter plate, and a pair of wiring standoffs configured to receive reverse patch cords.

FIG. 12 illustrates a seventh embodiment of an adapter plate 700 of the invention. The adapter plate 700 includes a plurality of lower fasteners 740 for retaining the adapter plate 700 on the panel 50, at least one pair of lower alignment pins (not shown) which fit into holes of tabs 56 of panel 50 for aligning the adapter plate 700 with the panel 50, a plurality of upper fasteners 744, and a plurality of upper alignment pins 748. The adapter plate 700 further includes a plurality of extended wiring standoffs 792 that hold the 110-type connector blocks 784 away from the adapter plate 700 to allow room for reverse patch cords 774 to engage the 110-type connector blocks 784. The extended wiring standoffs 792 and the reverse patch cords 774 are described in U.S. Pat. No. 5,718,604, the disclosure of which is incorporated herein by reference.

FIG. 13 illustrates an eighth embodiment of an adapter plate 800 for use with a modular connector system, such as the PATCHMAX® system. An exemplary modular connector system is described in U.S. Pat. Nos. 5,639,261 and 5,700,167, the disclosures of which are incorporated herein by reference. The adapter plate 800 includes a plurality of lower fasteners 840 and a pair of abutment flanges 896 extending downwardly from the side edges 810, 812 to abut the arrow-shaped tabs 56. The base member 802 includes a plurality of rectangular apertures 803 configured to receive wiring blocks 898 and a plurality of apertures 805*a*, 805*b*, 805*c*, 805*d* for receiving retainer clips 899.

Although the invention has been illustrated and described with respect to a 110-type connector systems, it will be appreciated by those of ordinary skill in the art that the invention is equally applicable to other types of connection systems. Furthermore, the number and location of fasteners and alignment pins is not limited to that described and illustrated. For example, fasteners for retaining the adapter plate on the panel can be formed on the panel rather than the adapter plate.

The purpose of the present invention is to provide multiple variations of interchangeable snap-on adapter plates that allow adaptation of a variety of different connectors and associated troughs to be mounted on cable panels, and any adapter plate configuration that accomplishes the purpose is acceptable. Therefore, the scope of the present invention is not to be considered as limited by the specifics of the particular adapter plates described above, but is only limited by the scope of the appended claims.

What is claimed is:

1. A cable management system comprising:

a support panel;

a cabling component;

an adapter plate disposed between the support panel and the cabling component;

a first plurality of fasteners attached to one of the support panel and the adapter plate and disposed to couple the adapter plate to the support panel; and a second plurality of fasteners attached to one of the adapter plate and the cabling component and disposed to couple the adapter plate to the cabling component, wherein the support panel includes a base plate, a pair of side plates extending from the base plate and cooperating with the base plate to define a channel, and a plurality of tabs extending from the side plates inwardly toward the center of the channel, the plurality of tabs being disposed to engage the first plurality of fasteners.

2. A cable management system as in claim 1 further comprising a first plurality of alignment pins attached to one of the support panel and the adapter plate, the first plurality of alignment pins being disposed to align the support panel and the adapter plate, and a second plurality of pins attached to one of the adapter plate and the cabling component, the second plurality of alignment pins being disposed to align the adapter plate and the cabling component.

3. The cable management system of claim 2, wherein the first and second pluralities of alignment pins are attached to the adapter plate.

4. The cable management system of claim 2, wherein the first and second pluralities of fasteners are attached to the adapter plate.

5. The cable management system of claim 1 further comprising a wiring block integrally formed on the adapter plate.

6. The cable management system of claim 1, wherein the adapter plate includes a first surface and a second surface and each of the first plurality of fasteners extends orthogonally from the first surface and includes a proximal end attached to the first surface, a distal end, and an engagement portion attached to the distal end.

7. The cable management system of claim 1 wherein the adapter plate includes a first surface and a second surface and each of the second plurality of fasteners extends from the second surface and includes a proximal end attached to the second surface, a distal end, and an engagement portion attached to the distal end.

8. The cable management system of claim 1, wherein the adapter plate includes a first plurality of alignment pins extending orthogonally from the adapter plate and being disposed to engage alignment apertures formed in the panel.

9. The cable management system of claim 1, wherein the adapter plate includes a second plurality of alignment pins extending orthogonally from the adapter plate and being disposed to engage alignment apertures formed in the cabling component.

10. A cable management system comprising:
a support panel;
an adapter plate having a first surface and a second surface;
a plurality of alignment pins projecting from the first surface;
a first plurality of fasteners projecting from the first surface, the first plurality of fasteners being disposed to engage the panel to retain the adapter plate on the panel; and
a second plurality of fasteners projecting from the second surface, the second plurality of fasteners being disposed to engage a wiring block,
wherein the panel includes a base plate, pair of side plates extending from the base plate and cooperating with the base plate to define a channel, and a plurality of tabs extending from the side plates inwardly toward the center of the channel, the plurality of tabs being disposed to engage the first plurality of fasteners.

11. The cable management system of claim 10 further comprising a first plurality of alignment pins, the first plurality of alignment pins cooperating with the first plurality of fasteners to align and retain the adapter plate on the support panel.

12. The cable management system of claim 10 further comprising a second plurality of alignment pins, the second plurality of alignment pins cooperating with the second plurality of fasteners to align and retain the wiring block on the adapter plate.

13. The cable management system of claim 12 wherein the second plurality of fasteners includes a third plurality of fasteners cooperating with the second plurality of alignment pins to align and retain a trough on the adapter plate.

14. The cable management system of claim 12 wherein the wiring block includes an extended wiring standoff adapted to engage with a reverse patch cord.

15. A cable management system comprising:
a support panel;
an adapter plate having a first surface and a second surface;
a trough;
a wiring block;
a first plurality of alignment pins projecting from the first surface, the first plurality of alignment pins being disposed to engage alignment apertures formed in the panel to align the adapter plate with the panel;
a first plurality of fasteners projecting from the first surface, the first plurality of fasteners being disposed to engage the panel to retain the adapter plate on the panel;
a second plurality of fasteners projecting from the second surface, the second plurality of fasteners being disposed to engage the wiring block to retain the wiring block on the adapter plate;
a third plurality of fasteners projecting from the second surface, the third plurality of fasteners being disposed to engage the trough to retain the trough on the adapter plate; and
a second plurality, of alignment pins, the second plurality of alignment pins cooperating with the second plurality of fasteners to align and retain the wiring block on the adapter plate wherein the support panel includes a base plate, a pair of side plates extending from the base plate and cooperating with the base plate to define a channel, and a plurality of tabs extending from the side plates inwardly toward the center of the channel, the plurality of tabs being disposed to engage the first plurality of fasteners.

16. The cable management system of claim 15 wherein the wiring standoff includes an extended block adapted to engage a reverse patch cord.

17. The cable management system of claim 15 wherein the trough includes a plurality of vertical support members and the third plurality of fasteners are disposed to engage the vertical support members to retain the trough on the adapter plate.

18. The cable management system of claim 17 further comprising a second plurality of alignment pins, wherein the trough includes a plurality of alignment apertures and the second plurality of alignment pins engages the plurality of alignment apertures to align the trough with the adapter plate.

19. A cable management system comprising:
a support panel;
a cabling component;
an adapter plate disposed between the support panel and the cabling component, the adapter plate being coupled to the support panel by a first plurality of fasteners and including a second plurality of fasteners for coupling the cabling component to the adapter plate; and a first plurality of alignment pins, the first plurality of alignment pins cooperating with the first plurality of fasteners to align and retain the adapter plate on the support panel wherein the support panel includes a base plate, a pair of side plates extending from the base plate and cooperating with the base plate to define a channel, and a plurality of tabs extending from the side plates inwardly toward the center of the channel, the plurality of tabs being disposed to engage the first plurality of fasteners.

20. The cable management system of claim 19, wherein the first plurality of fasteners are formed on the adapter plate, the first plurality of fasteners being attached to one side of the adapter plate and the second plurality of fasteners being attached to the opposite side of the adapter plate.

* * * * *